(12) United States Patent
Martinsen

(10) Patent No.: US 11,173,522 B2
(45) Date of Patent: Nov. 16, 2021

(54) DEVICE FOR SORTING USED BEVERAGE OR FOOD CONTAINERS

(71) Applicant: Tomra Systems ASA, Asker (NO)

(72) Inventor: Oddvar Martinsen, Saltnes (NO)

(73) Assignee: TOMRA SYSTEMS ASA, Asker (NO)

( * ) Notice: Subject to any disclaimer, the term of this patent is extended or adjusted under 35 U.S.C. 154(b) by 133 days.

(21) Appl. No.: 16/480,057

(22) PCT Filed: Jan. 27, 2018

(86) PCT No.: PCT/EP2018/052075
§ 371 (c)(1),
(2) Date: Jul. 23, 2019

(87) PCT Pub. No.: WO2018/138311
PCT Pub. Date: Aug. 2, 2018

(65) Prior Publication Data
US 2019/0374977 A1   Dec. 12, 2019

(30) Foreign Application Priority Data

Jan. 27, 2017 (EP) ..................................... 17153526

(51) Int. Cl.
*B07C 5/36* (2006.01)
(52) U.S. Cl.
CPC ...................................... *B07C 5/36* (2013.01)
(58) Field of Classification Search
CPC ........... B07C 5/36; B07C 5/365; B65G 4/766; B65G 2201/0244; G07F 7/06
See application file for complete search history.

(56) References Cited

U.S. PATENT DOCUMENTS

| 2,473,065 | A | * | 6/1949 | Miller | ....................... E05C 9/06 |
| | | | | | 292/37 |
| 3,214,006 | A | * | 10/1965 | Malmgren | ......... A01D 87/0046 |
| | | | | | 198/367 |

(Continued)

FOREIGN PATENT DOCUMENTS

| EP | 1276684 B1 | 11/2005 |
| GB | 1397017 A | 6/1975 |

OTHER PUBLICATIONS

International Search Report and Written Opinion issued in corresponding International Patent Application No. PCT/EP2018/052075, 12 pages (dated Apr. 6, 2018).

(Continued)

*Primary Examiner* — Charles A Fox
*Assistant Examiner* — Jessica L Burkman
(74) *Attorney, Agent, or Firm* — Buchanan Ingersoll & Rooney P.C.

(57) ABSTRACT

A device for sorting objects, such as used beverage or food containers, that are conveyed on a conveyor. The device includes a first guiding member which is pivotable about a first pivot axis and configured to, when the sorting device is situated in a first sorting position, guide containers in a first sorting direction, a second guiding member which is pivotable about a second pivot axis, a rotatable drive member, a first cam mechanism interconnecting the rotatable drive member with the first guiding member, and a second cam mechanism interconnecting the rotatable drive member with the second guiding member, wherein the device is configured to, upon rotation of the drive member, be actuated between the first sorting position and a second sorting position.

18 Claims, 5 Drawing Sheets

(56) References Cited

U.S. PATENT DOCUMENTS

| | | | |
|---|---|---|---|
| 6,776,279 B2* | 8/2004 | Krull | B07C 5/126 |
| | | | 198/343.1 |
| 2003/0010598 A1* | 1/2003 | Kiva | G07F 7/0609 |
| | | | 194/208 |
| 2009/0078617 A1 | 3/2009 | Large et al. | |
| 2014/0129362 A1* | 5/2014 | Marquis | G07G 1/0036 |
| | | | 705/23 |

OTHER PUBLICATIONS

Second Written Opinion issued in corresponding International Patent Application No. PCT/EP2018/052075, 6 pages (dated Dec. 18, 2018).

* cited by examiner

DEVICE FOR SORTING USED BEVERAGE OR FOOD CONTAINERS

TECHNICAL FIELD

The present disclosure relates to a device for sorting objects, such as used beverage or food containers, that are conveyed on a conveyor.

BACKGROUND

Devices for sorting objects, such as used beverage or food containers, may be used in reverse vending machines in e.g. super markets. Typically, such sorting devices are arranged to sort received objects in three directions.

An example of a device adapted for sorting objects, such as used beverage or food containers, that are conveyed on a conveyor, is disclosed in EP1276684 B1. This document discloses a device where objects conveyed on a conveyor belt are sorted by a channel-like gate which is pivotable about a vertical axis. The gate has two parallel side walls and is arranged to guide an object sideways relative to the longitudinal direction of the conveyor belt and, in a neutral position, to allow the object to pass unaffected by the gate. An actuator, which may turn the gate towards one side or another of the conveyor belt is connected to the gate.

This device is however bulky and space consuming.

There is hence a need for a less bulky device which may be used in reverse vending machines.

SUMMARY

It is an object of the present disclosure to provide an improved and more compact device for sorting used beverage or food containers.

The invention is defined by the appended independent claim, with embodiments being set forth in the appended dependent claims, in the following description and in the drawings.

According to a first aspect there is provided a device for sorting objects, such as used beverage or food containers that are conveyed on a conveyor, wherein the device comprises a first guiding member which is pivotable about a first pivot axis and configured to, when the sorting device is situated in a first sorting position, guide containers in a first direction, a second guiding member which is pivotable about a second pivot axis, a rotatable drive member, a first cam mechanism interconnecting the rotatable drive member with the first guiding member, and a second cam mechanism interconnecting the rotatable drive member with the second guiding member, wherein the device is configured to, upon rotation of the drive member, be actuated between said first sorting position and a second sorting position.

The device thus comprises two separate guiding members, each of which may have a guiding surface. By a device with two separate guiding members, each guiding member being pivotable about a separate pivot axis, a laterally compact device, yet enabling containers to be sorted in three different directions, can be provided. The device can thus be made less bulky compared to prior art devices for sorting objects. Furthermore, the first and second cam mechanisms, which together form a cam device for controlling pivotal movement of the first and second guiding members, allows the sorting device to be operated by one single actuator, such as a motor, via the drive member and thus provides for a compact and cost-efficient device.

The sorting device may be used to sort containers in a single sorting direction, in two sorting directions or in three sorting directions.

The sorting device may e.g. be used for sorting objects in a reverse vending machine configured for receiving and processing containers of a single type, containers of two types or containers of three types, thereby providing flexibility.

According to one embodiment the first and second guiding members are configured to, upon rotation of the drive member, pivot one by one about the first and second pivot axes, respectively. In this embodiment the shape of a cam of the first cam mechanism and the shape of a cam of the second cam mechanism are thus configured such that the first and second guiding members, upon rotation of the drive member, are pivoted one by one about the first and second pivot axes, respectively.

According to one embodiment the first and second guiding members are configured to, upon rotation of the drive member, pivot simultaneously about the first and second pivot axes, respectively. In this embodiment the shape of a cam of the first cam mechanism and the shape of a cam of the second cam mechanism are thus configured such that the first and second guiding members, upon rotation of the drive member, are pivoted simultaneously about the first and second pivot axes, respectively.

According to one embodiment the first and second guiding members are configured to, upon rotation of the drive member, pivot partly simultaneously about the first and second pivot axes, respectively. In relation to this application the expression "partly simultaneously" means that, when the sorting device is actuated/moved from one sorting position to another sorting position, both guiding members are pivoted simultaneously during a part of the actuation and during another part of the actuation one single guiding member is pivoted. For instance, during a first part of the movement of the sorting device from a first sorting position to a second sorting position, both guiding members are pivoted and during a subsequent part of the movement only one guiding member is pivoted.

According to one embodiment one of the guiding members makes a full rotational displacement, e.g. 35 or 40 degrees, and the other guiding member makes a minor rotational displacement, e.g. a few degrees or between 2° and 7°, when the sorting device is moved between two sorting positions. For instance, this can be used when a larger passage for containers is desired when the bottles are redirected.

According to one embodiment containers are allowed to continue in the direction of travel of the conveyor or are guided in a direction being different from said first sorting direction when the device is situated in said second sorting position.

According to one embodiment the second guiding member is configured to guide containers in a second sorting direction when the sorting device is situated in said second sorting position.

The drive member may be rotatable at least 40°, or at least 60°, or at least 80°, or at least 100°, or at least 120°; when rotated from one end position to the other. Additionally, or alternatively, the drive member may be rotatable at most 140°, or at most 120°, or at most 100°, or at most 80°; when rotated from one end position to the other.

According to one embodiment the angle by which the drive member is rotatable is within the range of 60°-120°.

The angle of deflection of the first guiding member may be at least 15°, or at least 20°, or at least 25°, or at least 30°, or at least 35°. Additionally, or alternatively, the angle of deflection of the first guiding member may be at most 55°, or at most 50°, or at most 45°, or at most 40°, or at most 35°. According to one embodiment the angle of deflection of the first guiding member is within the range of 25°-45°. The angle of deflection of a guiding member is the pivotation of the a guiding member when moved between a neutral position and a guiding position the first and the third sorting position.

In relation to this application the express "the neutral position of a guiding member" refers to the position wherein the direction of the transported containers are unaffected or substantially unaffacted by the guiding member; and the expression "the guiding position of a guiding member" refers to the position wherein the transported containers are guided and/or redirected by the guiding member.

The angle of deflection of the second guiding member may be at least 15°, or at least 20°, or at least 25°, or at least 30°, or at least 35°. Additionally, or alternatively, the angle of deflection of the second guiding member may be at most 55°, or at most 50°, or at most 45°, or at most 40°, or at most 35°.

The angle of deflection of the second guiding member is the pivotation of the second guiding member when the sorting device is situated in the second sorting position. According to one embodiment the angle of deflection of the second guiding member is within the range of 25°-45°.

According to one embodiment said first and second sorting directions are opposite to each other. In this embodiment containers may thus be guided in opposite directions and away from each other.

According to one embodiment the device may assume a third sorting position.

According to one embodiment said third sorting position is an intermediate sorting position in which containers are allowed to continue in the direction of travel of the conveyor.

According to one embodiment at least one of the first and second cam mechanisms comprises a cam that forms a part of one of said guiding members and a cam follower that forms a part of the drive member.

According to one embodiment the first cam mechanism comprises a first cam groove and a first cam follower received in the first cam groove, and the second cam mechanism comprises a second cam groove and a second cam follower received in the second cam groove.

According to one embodiment at least one of said cam followers forms a part of the drive member.

According to one embodiment one of said cam grooves is formed in a part of one of the first and second guiding members and preferably the other one of said cam grooves is formed in a part of the other one of the first and second guiding members.

According to one embodiment at least one of said cam followers comprises a roller assembly. This embodiment has the advantage that friction losses may be reduced.

According to one embodiment at least one of the guiding members comprises a curved guiding plate.

According to one embodiment one single actuator is connected to the drive member, said actuator being capable of rotating the drive member in the clockwise direction and in the anti-clockwise direction.

According to one embodiment said one single actuator is a motor.

DETAILED DESCRIPTION

Figure 1:
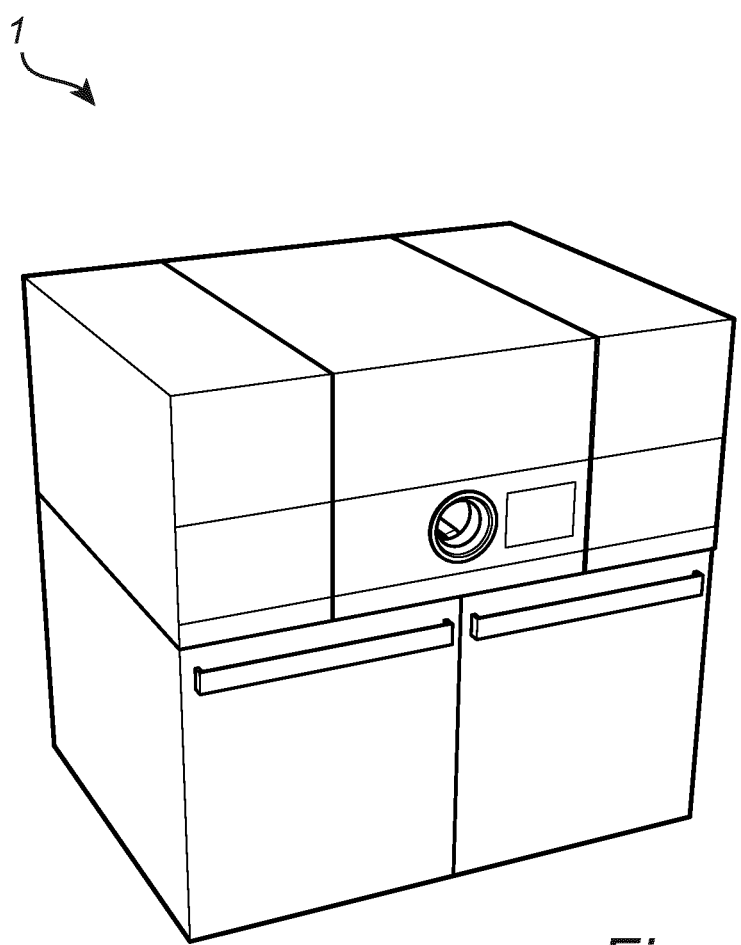
FIG. 1 illustrates a reverse vending machine.

FIG. 1 shows a reverse vending machine 1 for receiving, sorting and processing of objects, such as used food and/or beverage containers. The reverse vending machine 1 may be located in e.g. a local store, a residential area or a car park, for receiving and processing used beverage and/or food containers from consumers. The reverse vending machine 1 is provided with a device for sorting objects according to an embodiment of the present disclosure.

A reverse vending machine provided with a sorting device according to the present disclosure may be configured to receive and process one single type of containers, e.g. metal containers, two types of containers, e.g. metal containers and plastic containers, or three types of containers, e.g. metal containers, plastic containers and glass containers.

Figure 2:
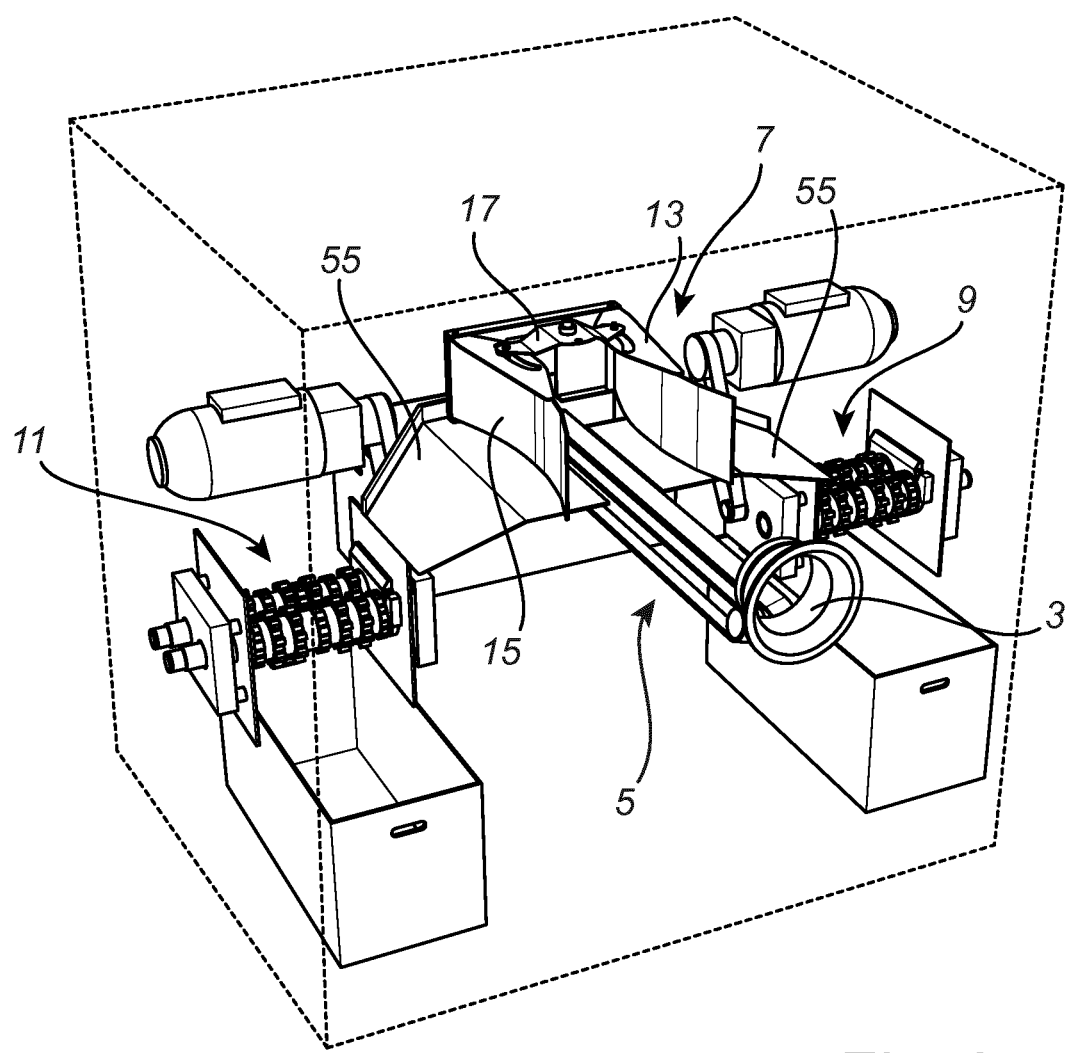
FIG. 2 illustrates the interior of the reverse vending machine shown in FIG. 1.

Now referring to FIG. 2, which illustrates the interior of the reverse vending machine 1, the reverse vending machine 1 comprises an inlet opening 3, a conveyor 5, a sorting device 7, a first container crushing device 9 and a second container crushing device 11. The first container crushing device 9 may be adapted for crushing metal cans and the second container crushing device 11 may be adapted for crushing plastic bottles. The reverse vending machine 1 is thus configured to receive and process containers of two types of materials.

In this document the terms guiding member and sorting member are used interchangeably.

The sorting device 7 is arranged to sort containers, which are received through the inlet opening 3 and conveyed by the conveyor 5, either to the first crushing device 9, to the second crushing device 11 or straight through to a trash collector (not shown). To this end, the sorting device 7 comprises a first pivotable guiding member 13, a second pivotable sorting member 15 and a rotatable drive member 17 arranged to operate each of the first and second guiding members 13, 15. The drive member 17, which is rotatable in the clockwise direction and in the anti-clockwise direction by an actuator (not shown), is arranged to drive the sorting members 13, 15 between different sorting positions of the sorting device 7. In FIG. 2, the sorting device 7 is situated in an idle sorting position, also referred to as a second or a third sorting position, in which the guiding members 13, 15 are separated from each other and allow containers 14 conveyed by the conveyor 5 to pass straight through the sorting device 7 to a rear part of the machine 1, as illustrated by arrows in FIG. 3b. Hence, in the idle sorting position containers continue in the direction of travel of the conveyor 5, and may thus be forwarded to a collector (not shown) situated downstream of the sorting device 7.

In this embodiment the conveyor 5 is a V conveyor. Alternatively, the conveyor may be a flat conveyor. The conveyor 5 may comprise one or several conveyor belts. A stationary guide device 55 comprising two guide plates are arranged to guide containers sorted by the sorting device 7 to any of the crushing devices 9, 11.

The reverse vending machine 1 further comprises an inspection means (not shown) for identifying containers received through the inlet opening 3. This inspection means, which is situated upstream of the sorting device 7, is capable of identifying the material of a container received through the inlet opening 3. Based on the information obtained by the inspection means the sorting device 7 may be driven to an appropriate sorting position to guide the identified container to the left or right, or to allow the container to continue straight ahead. To this end, each of the sorting device 7 and the inspection means is connected to a control unit (not shown) of the machine 1. The inspection means may be a camera or a scanner, such as a bar code reader.

Figure 3A:
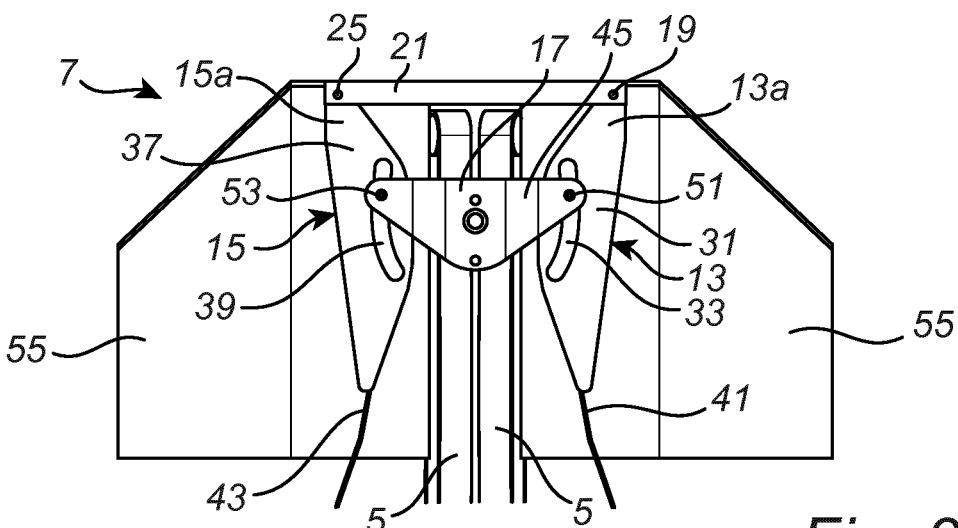
FIG. 3a is a top view and illustrates a device for sorting of objects according to an embodiment of the present disclosure in an idle sorting position.
Figure 3B:
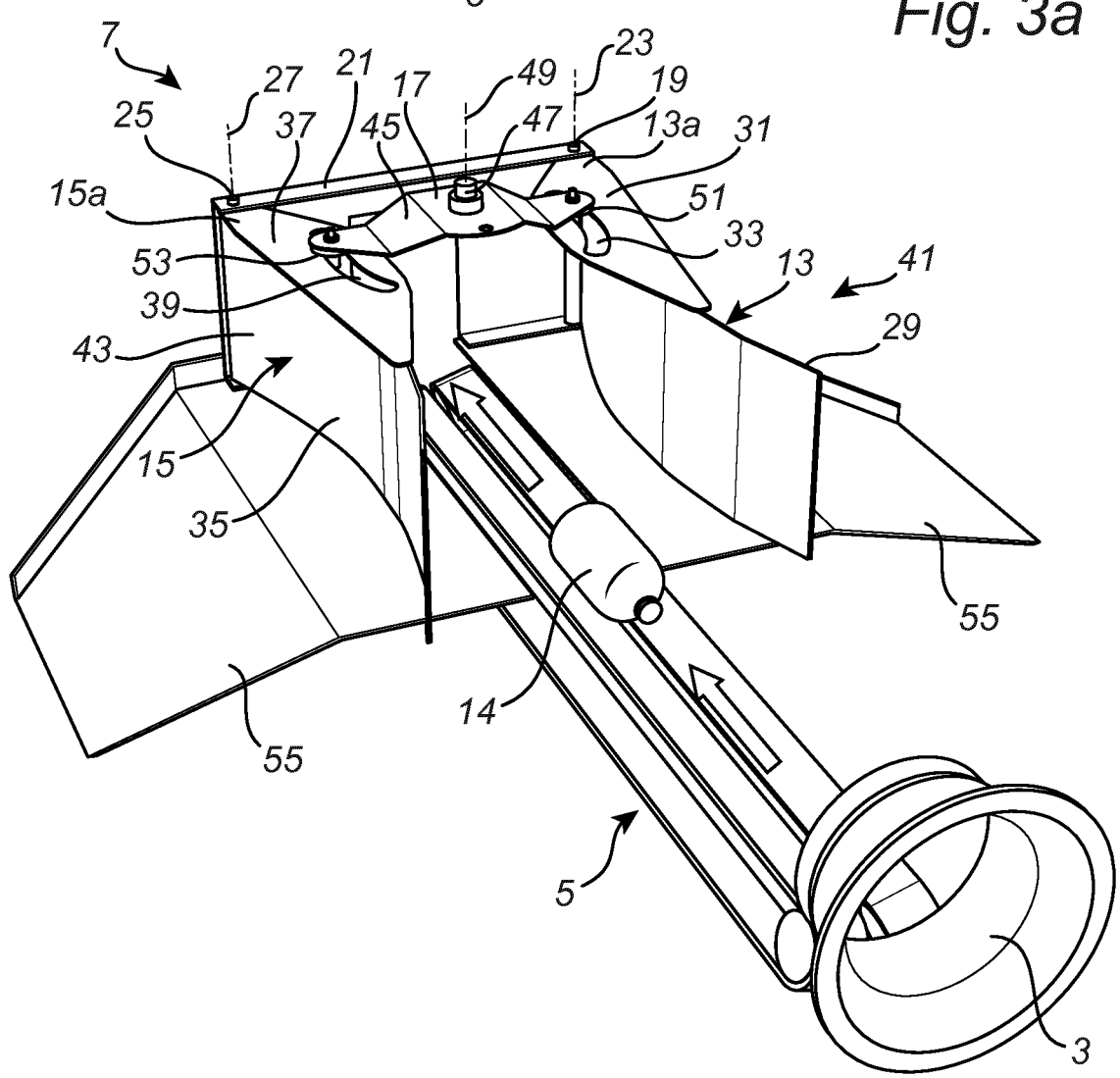
FIG. 3b is a perspective view of the device shown in FIG. 3a in the idle sorting position.

Referring to FIG. 3a and FIG. 3b, the sorting device 7 will now be discussed in detail.

The first sorting member 13 of the sorting device 7 is at one end 13a pivotally arranged by means of a pivot shaft 19 which is connected to a support structure 21. The support structure 21 may be secured to a frame part (not shown) of the reverse vending machine 1. The first pivot shaft 19 defines a first pivot axis 23.

The second sorting member 15 of the sorting device device 7 is at one end 15a pivotally arranged by means of a second pivot shaft 25 which is connected to the support structure 21. The second pivot shaft 25 defines a second pivot axis 27.

The first guiding member 13 comprises a first guiding element, in the form of a first guiding plate 29, and a cam element in the form of a first cam plate 31. A first cam, in the form of a first curved cam groove 33, is formed in the first cam plate 31. The curvature of the first cam groove 33 is adapted to control pivotal movement of the first guiding member 13.

The second guiding member 15 comprises a second guiding element, in the form of a second guiding plate 35, and a second cam element in the form of a second cam plate 37. A second cam, in the form of a second curved cam groove 39, is formed in the second cam plate 37. The curvature of the second cam groove is adapted to control pivotal movement of the second guiding member 15.

Figure 4A:
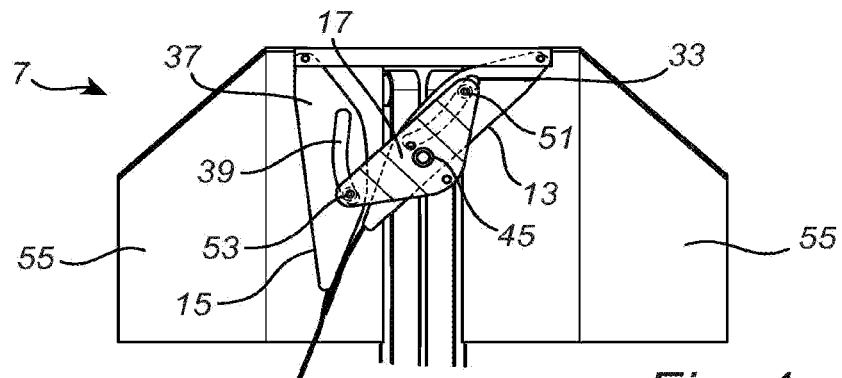
FIG. 4a is a top view and illustrates the device shown in FIG. 3a in a first sorting position.
Figure 4B:
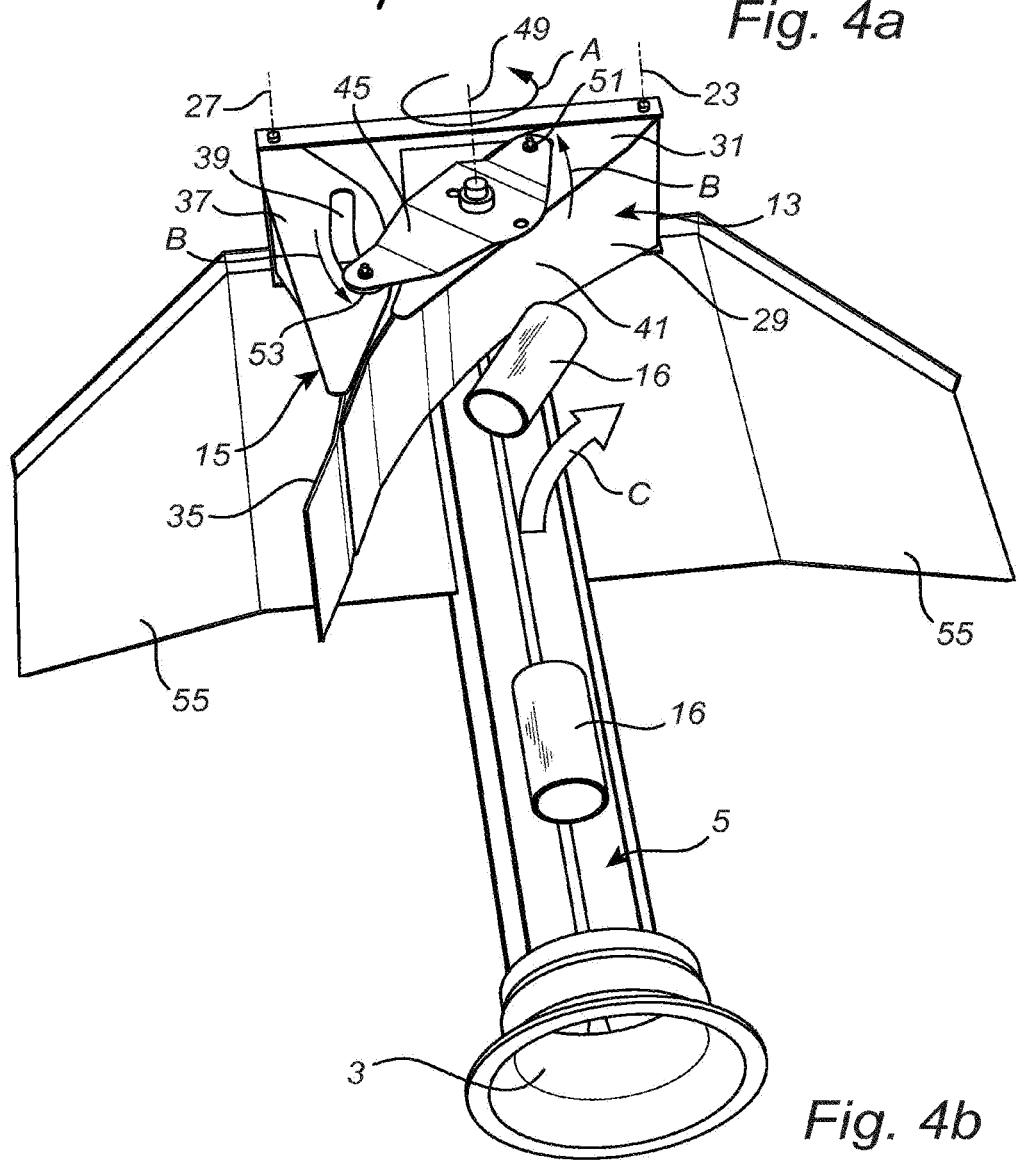
FIG. 4b is a perspective view and illustrates the device shown in FIG. 3a in the first sorting position.

The first guiding plate 29 forms a first guiding surface 41 which is configured to, when the sorting device 7 is situated in a first sorting position, guide containers 16 to the right, as illustrated by arrow C in FIG. 4b. The second guiding plate 35 forms a second guiding surface 43 which is configured to, when the sorting device 7 is situated in a second sorting position, guide containers 18 to the left, as illustrated by arrow F in FIG. 5b. Each of the first and second guiding surface 41, 43 is thus configured to guide containers conveyed on the conveyor 5 laterally. The first and second guiding surfaces 41, 43 are facing away from each other. In the third sorting position, in which the guide plates 31, 35 are separated from each other to allow containers 14 to pass therebetween, none of the guiding surfaces 41, 43 is thus active. In the third sorting position, received containers thus continue in a third sorting direction which corresponds to the direction of travel of the conveyor 5. Hence, containers, here illustrated by a glass bottle 14, which can not be processed in the first crushing device 9 or in the second processing device 11, may be forwarded to a collector at the end of the conveyor 5.

The drive member 17 comprises a rotatable element, in the form of a rotatable plate 45, which is fixedly mounted to a drive shaft 47. The drive shaft 47 is connected to an actuator (not shown), such as e.g. a motor, and defines a third pivot axis 49. The drive member 17 is configured to perform a partial rotation in any direction. The actuator is capable of rotating the drive member 17 in the clockwise direction and in the anti-clockwise direction.

The drive plate 45 is at one side of the pivot axis 49 provided with a first cam follower, in the form of a first cam follower roller 51, and at an opposite side of the third pivot axis 49 provided with a second cam follower in the form of a second cam follower roller 53. Each of the first and second cam follower rollers 51, 53 is thus located at a distance from the third pivot axis 49. The first cam follower roller 51 is received in the first cam groove 33, which is formed in the first cam plate 31, and the second cam follower roller 53 is received in the second cam groove 39 which is formed in the second cam plate 37.

In FIG. 4a, which illustrates the sorting device 7 in the first sorting position, the drive member 17 has been rotated anti-clockwise about the third pivot axis 49, as illustrated by arrow A. This rotation of the drive member 17 causes the first cam follower roller 51 to travel in the first cam groove 33 and the second cam follower roller 53 to travel in the second cam groove 39, as illustrated by arrows B, and the first guiding member 13 to pivot about the first pivot axis 23. Upon actuation of the sorting device 7 from the intermediate sorting position (FIG. 3a) to the first sorting position (FIG. 4a), the drive member 17 is rotated approximately 40 degrees anti-clockwise about the third pivot axis 49, which causes the first guiding member 13 to pivot approximately 36 degrees about the first pivot axis 23, i.e. to deflect about 36 degrees. In this embodiment, the angle of deflection of the first guiding member 13 is thus approximately 36 degrees. The second guiding member 15 is not pivoted and thus maintains its position. In the first sorting position the first guiding surface 41 guides containers 16, such as cans, to the right, as illustrated by arrow C, to be forwarded to the first crushing device 9 by the stationary guide plate 55.

Figure 5A:
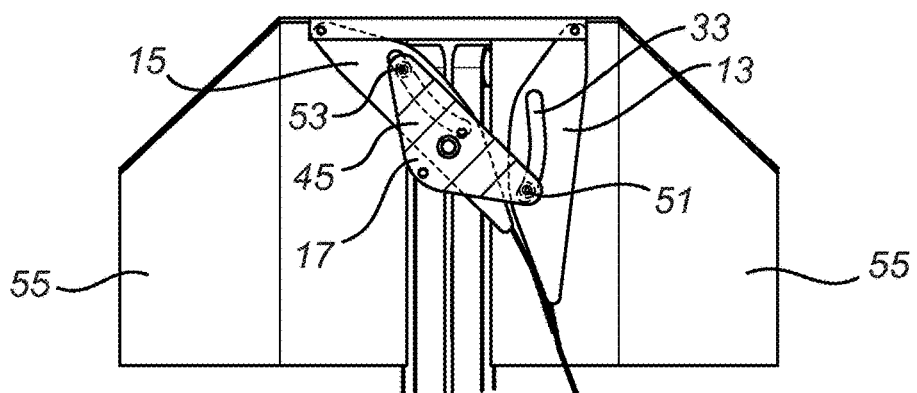
FIG. 5a is a top view and illustrates the device shown in FIG. 3a in a second sorting position.
Figure 5B:
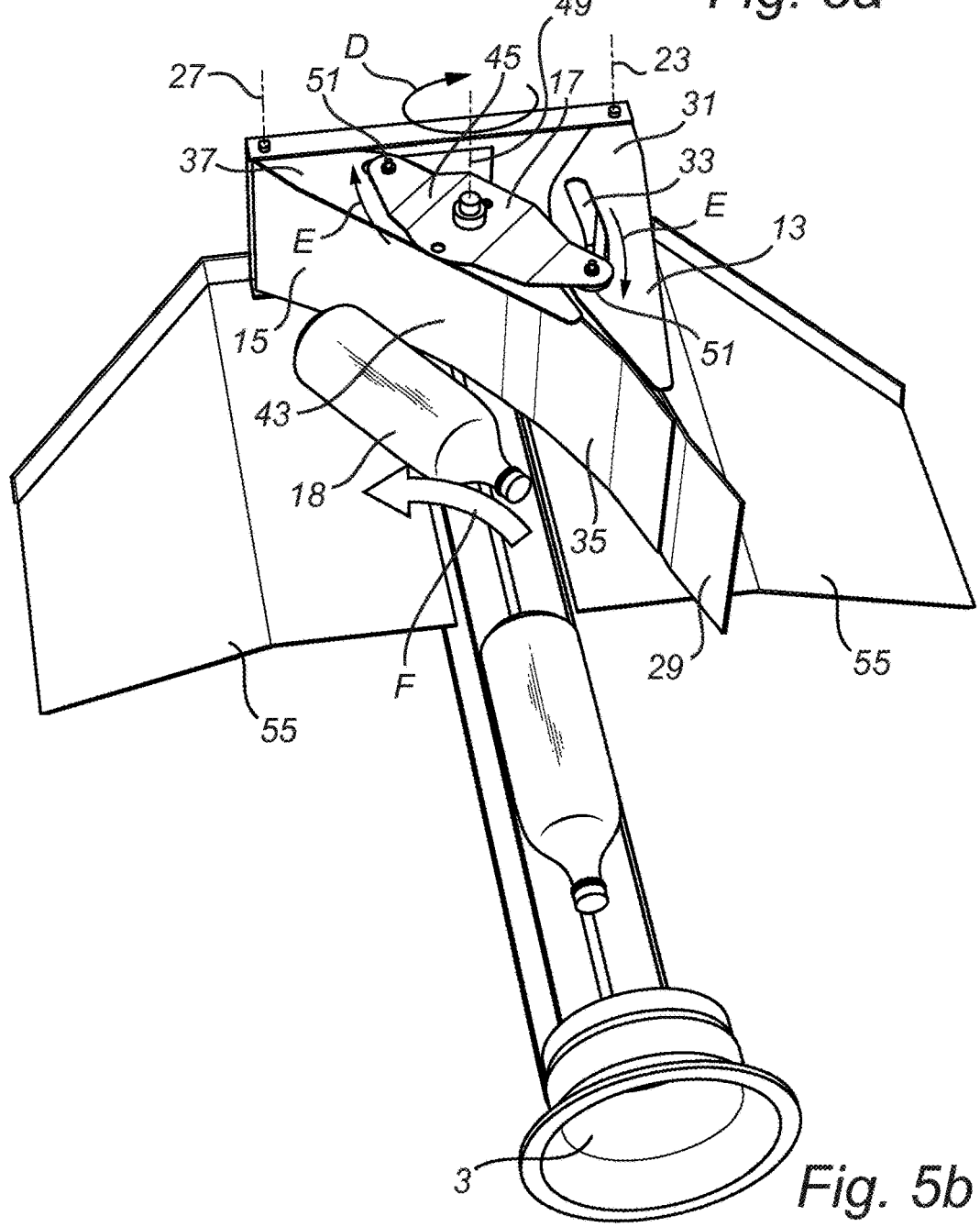
FIG. 5b is a perspective view and illustrates the device shown in FIG. 3a and FIG. 3b in the second sorting position.

In FIG. 5a, which illustrates the sorting device 7 in the second sorting position, the drive member 17 has been rotated clock-clockwise about the third pivot axis 49, as illustrated by arrow D. This rotation of the drive member 17 causes the first cam follower roller 51 to travel in the first cam groove 37 of the first cam plate 31 and the second cam follower roller 53 to travel in the second cam groove 39 of the second cam plate 37, as illustrated by arrows E, and the second guiding member 15 to pivot about the second pivot axis 27. Upon actuation of the sorting device 7 from the intermediate sorting position (FIG. 3a) to the second sorting position (FIG. 5a), the drive member 17 is rotated approximately 40 degrees clockwise about the third pivot axis 49, which causes the second guiding member 13 to pivot approximately 36 degrees about the second pivot axis 27, i.e. to deflect about 36 degrees. In this embodiment, the angle of deflection of the second guiding member 15 is thus approximately 36 degrees. The first guiding member 13 is not pivoted and thus maintains its position. In the second sorting position the second guiding surface 43 directs containers 18, such as plastic bottles, to the left, as illustrated by arrow F, to be forwarded to the second crushing device 11 by the stationary guide plate 55.

The first and second cam grooves 33, 39 are thus configured to, upon rotation of the drive member 17, control the pivotal movement of the first and second guiding members 13, 15. Upon rotation of the drive member 17, the first and second guiding plates 29, 35 are pivoted one by one under the guidance of the first and second cam mechanisms.

Alternatively, upon rotation of the drive member 17, the first and second guiding plates 29, 35 are pivoted simultaneously under the guidance of the first and second cam mechanisms.

The curvature of the first cam groove 33 and the curvature of the second cam groove 39 may thus be adapted such that the first and second guiding members 13, 15, upon rotation of the drive member 17, are pivoted one by one or simultaneously or partly simultaneously about the first and second pivot axes 23, 27, respectively.

The sorting device 7 of the present disclosure thus comprises two separate guiding members 13, 15, each of which has a guiding element 29, 25, which are controlled by a cam device and a single actuator.

Hence, the first cam plate 31, in which the first cam groove 33 is formed, forms together with the first cam follower 51 a first cam mechanism and the second cam plate 37, in which the second cam groove 39 is formed, forms together with the second cam follower 53 a second cam mechanism. The first and second cam mechanisms together form a cam device that, upon rotation of the drive member 17, causes the first and second guiding members 13, 15 to pivot one by one. Hence, when the sorting device 7 is actuated from the idle sorting position, illustrated in FIG. 3a, to the first sorting position, illustrated in FIG. 4a, only the first sorting member 13 is pivoted, and when the sorting device 7 is actuated from the idle sorting position to the second sorting position, illustrated in FIG. 5a, only the second sorting member 15 is pivoted. When the sorting device 7 is actuated from the first sorting position to the second sorting position the first sorting member 13 is first pivoted. Then, i.e. when the first sorting member 13 has been pivoted, the second sorting member 15 is pivoted. Upon actuation of the sorting device 7 from the first sorting position to the second sorting position, the idle sorting position is thus passed. The idle sorting position is thus an intermediate sorting position and the direction of travel of the conveyor 5 forms a third sorting direction. Upon actuation of the sorting device 7 from the first sorting position (FIG. 4a) to the second sorting position (FIG. 5a), the drive member 17 is rotated approximately 80 degrees clockwise about the third pivot axis 49, which first causes the second guiding member 13 to pivot approximately 36 degrees about the second pivot axis 27 and then the first guiding member 13 to pivot approximately 36 degrees about the first pivot axis 23.

Upon actuation of the sorting device 7 between the first sorting position and the second sorting position the drive member 17 does not perform a full rotation but a partial rotation.

The reverse vending machine 1 is configured to receive and process metal containers and plastic containers. Containers that cannot be processed in the first crushing device 9 or in the second crushing device 11, which are illustrated by a glass container 14 in FIG. 3b, are allowed to continue straight to e.g. a collector (not shown). The sorting device 7 is thus in this case arranged to guide containers 16 to the right, guide containers 18 to the left and allow containers 14 to continue in the direction of travel of the conveyor 5.

However, the sorting device 7 may be used in a machine configured to receive and process containers of a single type, such as metal containers or plastic containers. Then, the sorting device may be arranged to guide containers in a first sorting direction, e.g. to the right. Received containers that are not to be sorted in the first sorting direction may be allowed to continue in the direction of travel of the conveyor 5. In this case, the idle sorting position, illustrated in FIG. 3a, forms a second sorting position and the direction of travel of the conveyor 5 forms a second sorting direction. When the sorting device is used in a machine configured to provide two sorting directions, i.e. when only two sorting positions are needed, a shorter rotation of the drive member is sufficient e.g. about half of the rotation needed compared to when the sorting device provides three sorting directions.

Also, the sorting device 7 may be used in a machine configured to receive and process containers of three types of containers, such as metal containers, plastic containers and glass containers. Then, the sorting device may be arranged in the same manner as illustrated hereinabove with reference to FIGS. 3a-b, FIGS. 4a-b and FIGS. 5a-b, i.e. to guide metal containers 16 in a first sorting direction, e.g. to the right, guide plastic containers 18 in a second sorting direction, e.g. to the left, and, when the sorting device 7 is situated in a third sorting position, allow glass containers 14 to continue in a third sorting direction, which corresponds to the direction of travel of the conveyor 5, to a glass container processing device.

A sorting device according to the present disclosure may thus be used for sorting objects in a reverse vending machine configured for receiving and processing containers of a single type, two types or three types.

The invention has been described with reference to some detailed examples, however the skilled person realizes that a number of modifications of the embodiments described herein are possible without departing from the scope of the invention, which is defined in the appended claims. For example the design of the guiding element of the guiding members may be given different designs depending on e.g. material, size, shape and weight of the containers that the sorting device is to be able to handle. Guided by this description and possibly in combination with some testing the person skilled in the art will be able to find a suitable design.

Hereinbefore, with reference to FIG. 3a, it has been described that each of the cam mechanisms comprises a cam follower which is secured to the drive member and a cam plate provided with a cam. It is however appreciated that one or both cams may be formed as a part of the drive member and that cam follower(s) may be form a part of one or both of the guiding members.

Furthermore, the cam mechanisms may comprise sliding cam followers instead of rolling cam followers or a combination thereof.

Also, it has been described that a guiding element, such as a guiding plate, of each of the first and second guiding members may be curved. Alternatively, such a guiding element may be planar.

The invention claimed is:

1. A device for sorting objects conveyed on a conveyor, wherein:
   the device comprises:
   a first guiding member which is pivotable about a first pivot axis and configured to, when the sorting device is situated in a first sorting position, guide containers in a first sorting direction,
   a second guiding member which is pivotable about a second pivot axis,
   a rotatable drive member,
   a first cam mechanism interconnecting the rotatable drive member with the first guiding member, and
   a second cam mechanism interconnecting the rotatable drive member with the second guiding member, wherein the device is configured to, upon rotation of the drive member, be actuated between said first sorting position and a second sorting position, wherein the first guiding member is configured to pivot to the first sorting position by pivoting about the first pivot axis in a direction toward the second guiding member, and wherein the second guiding member is configured to pivot to the second sorting position by pivoting about the second pivot axis in a direction toward the first guiding member.

2. The device according to claim 1, wherein, when the device is situated in said second sorting position, containers are allowed to continue in the direction of travel of the conveyor.

3. The device according to claim 1, wherein at least one of the guiding members comprises a curved guiding plate.

4. The device according to claim 1, wherein the drive member is rotatable by at least 60° and/or by at most 120°.

5. The device according to claim 1, wherein the angle of deflection of the first guiding member is at least 25° and/or wherein the angle of deflection of the first guiding member is at most 45°;

and/or wherein the angle of deflection of the second guiding member is at least 25° and/or wherein the angle of deflection of the second guiding member is at most 45°.

6. The device according to claim 1, wherein when the device is situated in said second sorting position, containers are guided in a direction being different from said first sorting direction.

7. The device according to claim 1, wherein the first and second guiding members are configured to, upon rotation of the drive member, pivot one by one.

8. The device according to claim 7, wherein at least one of the first and second cam mechanisms comprises a cam that forms a part of said at least one of said guide members and at least one cam follower that forms a part of the drive member.

9. The device according to claim 1, wherein the second guiding member is configured to, when the sorting device is situated in said second sorting position, guide containers in a second sorting direction.

10. The device according to claim 9, wherein said first and second sorting directions are opposite to each other.

11. The device according to claim 1, wherein the device may assume a third sorting position.

12. The device according to claim 11, wherein said third sorting position is an intermediate sorting position in which containers are allowed to continue in the direction of travel of the conveyor.

13. The device according to claim 1, wherein at least one of the first and second cam mechanisms comprises a cam that forms a part of said at least one of said guiding members and a cam follower that forms a part of the drive member.

14. The device according to claim 13, wherein at least one of said cam followers comprises a roller assembly.

15. The device according to claim 1, wherein the first cam mechanism comprises a first cam groove and a first cam follower received in the first cam groove, and the second cam mechanism comprises a second cam groove and a second cam follower received in the second cam groove.

16. The device according to claim 15, wherein one of said cam grooves is formed in a part of one of the first and second guiding members and the other one of said cam grooves is formed in a part of the other one of the first and second guiding members.

17. The device according to claim 1, wherein one single actuator is connected to the drive member, said actuator being capable of rotating the drive member in the clockwise direction and in the anti-clockwise direction.

18. The device according to claim 17, wherein said one single actuator is a motor.

* * * * *